United States Patent
Kim et al.

(10) Patent No.: US 9,908,996 B2
(45) Date of Patent: Mar. 6, 2018

(54) CATECHOLAMINE-FLAKY GRAPHITE BASED POLYMER COMPLEX FOR PREPARATION OF COMPOSITE

(71) Applicants: Cheorwon Plasma Research Institute, Galmal-eup (KR); Amogreentech Co., Ltd., Gimpo-si (KR)

(72) Inventors: Seong-In Kim, Galmal-eup (KR); Won Seok Choi, Yongin-si (KR); Won Young Lee, Seoul (KR); Young Ju Jung, Uijeongbu-si (KR)

(73) Assignees: Cheorwon Plasma Research Institute, Galmal-eup (KR); Amogreentech Co., Ltd., Gimpo-si (KR)

( * ) Notice: Subject to any disclaimer, the term of this patent is extended or adjusted under 35 U.S.C. 154(b) by 0 days.

(21) Appl. No.: 15/128,880

(22) PCT Filed: Mar. 23, 2015

(86) PCT No.: PCT/KR2015/002812
§ 371 (c)(1),
(2) Date: Sep. 23, 2016

(87) PCT Pub. No.: WO2015/147501
PCT Pub. Date: Oct. 1, 2015

(65) Prior Publication Data
US 2017/0107355 A1    Apr. 20, 2017

(30) Foreign Application Priority Data
Mar. 24, 2014 (KR) .......... 10-2014-0033854

(51) Int. Cl.
C08K 9/00 (2006.01)
C08K 9/08 (2006.01)
C08L 23/12 (2006.01)
C08K 3/04 (2006.01)

(52) U.S. Cl.
CPC .......... C08K 9/08 (2013.01); C08K 3/04 (2013.01); C08L 23/12 (2013.01)

(58) Field of Classification Search
CPC .......... C08K 9/08; C08K 3/04
See application file for complete search history.

(56) References Cited

U.S. PATENT DOCUMENTS 9,789,539 B2 * 10/2017 Kim .......... B22F 1/02
2011/0284805 A1   11/2011 Samulski et al.
2016/0318100 A1 * 11/2016 Kim .......... B22F 1/0018

FOREIGN PATENT DOCUMENTS

| JP | 2009-73784 A | 4/2009 |
| KR | 10-2013-0019232 A | 2/2013 |
| KR | 10-2013-0031294 A | 3/2013 |
| KR | 10-1330227 B1 | 11/2013 |
| KR | 10-2013-0134446 A | 12/2013 |

OTHER PUBLICATIONS

Machine Translatino of KR 10-2013-0019232 (2013).*

* cited by examiner

*Primary Examiner* — Hannah Pak
(74) *Attorney, Agent, or Firm* — Seed IP Law Group LLP

(57) ABSTRACT

The present invention relates to a flaky graphite-based polymer nanocomplex for preparation of a polymer complex, and more specifically, to a complex to which a polymer is stably bonded by surface-modifying, with a catecholamine, flaky graphite having a structure with nanoparticles crystallized at a high density on the surface. If the complex is dispersed in a target polymeric resin, preferably, in a homogeneous polymeric resin which is bonded to the complex, the complex is dispersed in the polymeric resin homogeneously and evenly, thereby being capable of obtaining a composite having excellent function in conductivity, thermal conductivity, etc.

19 Claims, 7 Drawing Sheets

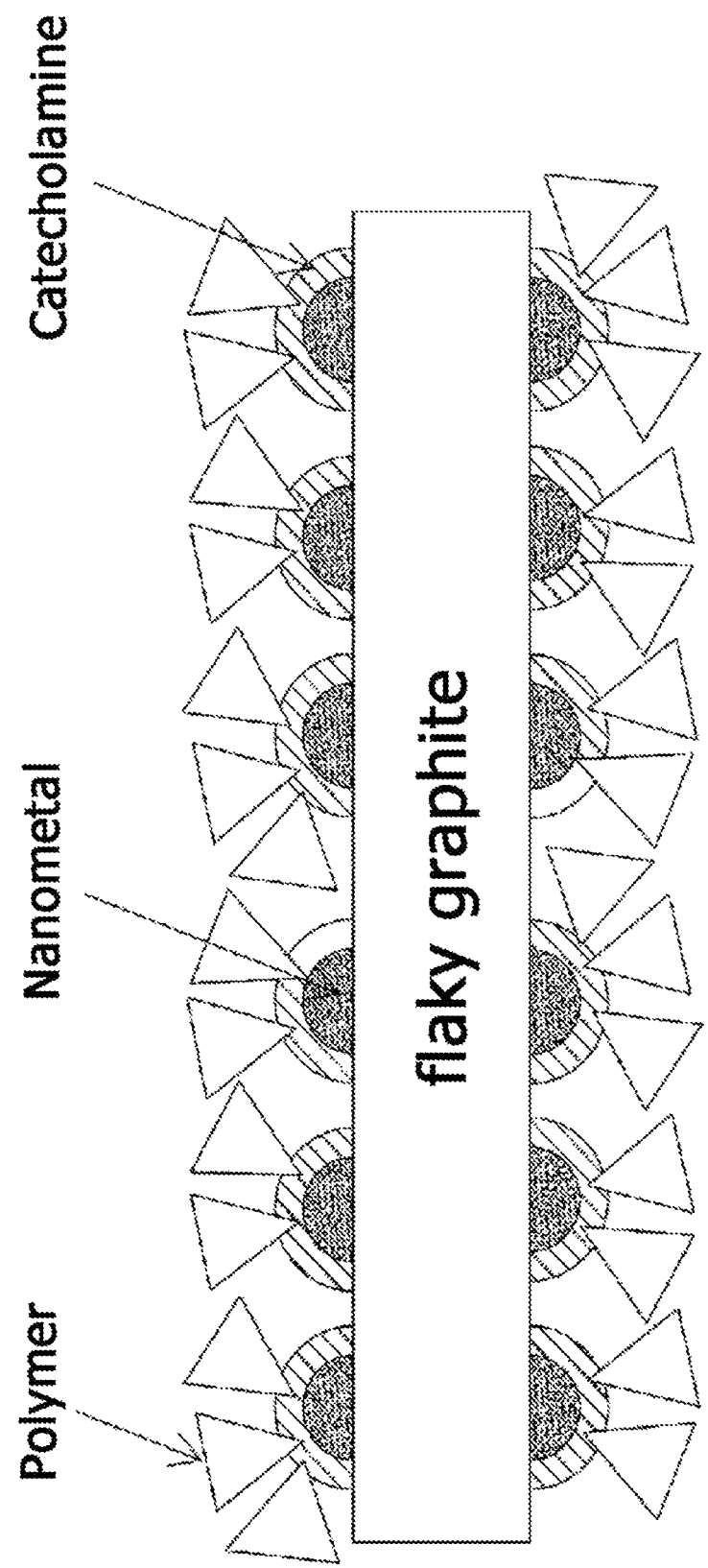

CATECHOLAMINE-FLAKY GRAPHITE BASED POLYMER COMPLEX FOR PREPARATION OF COMPOSITE

TECHNICAL FIELD

The present invention relates to a flaky-graphite-based polymer nanocomplex for preparation of a polymer composite, and more specifically, to a complex to which a polymer is stably bonded by modifying, with a catecholamine, the surface of flaky graphite having a structure in which nanoparticles are crystallized on the surface thereof at a high density, and a method of preparing the same. The present invention includes a use for obtaining a composition having excellent functionality in terms of conductivity, thermal conductivity, and the like by evenly dispersing the complex in a target polymeric resin.

BACKGROUND ART

A nanocomposite is a material made by hybridizing mutually different heterogeneous materials at a nanoscale level by a physical or chemical method in order to overcome a limitation of properties of a material made by simply combining homogeneous materials or heterogeneous materials and obtain synergistic effects on multi-function and high performance. The nanocomposite is divided based on types of a matrix and a filler. Here, a nanocomposite in which a polymer is used as a matrix is a composite which is prepared by uniformly dispersing a nanoscale filler in a polymeric resin and has excellent mechanical strength, an excellent gas barrier property, and greatly improved abrasion resistance and thermal resistance. When a composite is prepared by charging a polymeric resin with a nanoscale filler, even with a small amount of a filler, properties are greatly improved, compared to a polymer composite prepared by charging a polymeric resin with a microscale filler.

A polymer nanocomposite based on such excellent properties has attracted attention as new materials that are expected to be applied in fields such as the automobile industry, the electronics industry, the energy industry, and the like, all of which require a highly functional composite. Currently, research on the development of a high functional polymer nanocomposite prepared by charging a polymeric resin with carbon-based fillers such as carbon nanotubes, carbon fibers, graphene, and the like has been actively conducting. Among them, flaky graphite has currently attracted the most attention as a filler.

Carbon nanostructures such as flaky graphite and the like have advantages of having a large surface area, highly excellent mechanical strength, thermal and electrical properties, flexibility, and transparency, compared to other conventional nanoadditives (such as Na-MMT, LDH, CNT, CNF, EG, etc.). Therefore, currently, research on the development of a high performance and functional polymer composite having excellent conductivity and mechanical strength, which is prepared by charging a polymeric resin with flaky graphite, has been actively conducting.

However, since carbon nanostructures such as flaky graphite and the like are difficult to be uniformly dispersed in a polymeric resin and an organic solvent due to van der Waals forces between them and a very stable chemical structure that they have, it is difficult to prepare a polymer composite exhibiting uniformity. As a result, although a carbon nanostructure itself has excellent properties, research on actually applicable technology is very limited.

For solving these problems, research on a method of modifying a surface so that a carbon nanostructure is capable of forming a uniformly dispersed phase in an organic solvent has been actively conducting.

In order to uniformly disperse a carbon nanostructure and increase a mutual affinity with a polymer, it is necessary to perform an additional pretreatment process on the surface of a carbon nanostructure. In a conventional method of preparing a complex, a functional group is introduced into a carbon nanostructure using a wet acid treatment method in order to improve dispersibility in a polymer, but the wet acid treatment method has disadvantages in that a yield of a treated carbon nanostructure is low and the method is not environmentally friendly.

In addition, there is a method of introducing a functional group on the surface after exposure to gases in a vacuum using plasma deposition, but the method has difficulty in a storing method of a carbon nanostructure. In this case, since the carbon nanostructure has been chemically etched, aging of a treated carbon nanostructure is accelerated to degrade intrinsic properties of a carbon nanostructure.

The present inventors first prepared a complex composed of flaky graphite, a catecholamine, and polymer layers, which has high cohesion with a polymer without degradation of intrinsic properties of flaky graphite by coating, i.e., by modifying a surface of, flaky graphite having a crystallized nanometal on the surface thereof with a catecholamine such as polydopamine and the like, and then confirmed that a composite having remarkably improved dispersibility in a target polymeric resin can be prepared as thus. Therefore, the present invention was completed based on this fact.

DISCLOSURE

Technical Problem

The present invention relates to a complex capable of being evenly dispersed in a polymeric resin, which can be usefully used to prepare a polymer composite.

An object of the present invention is to provide a flaky-graphite-based complex composed of a nanoparticle/flaky graphite-fused complex, a catecholamine coating layer, and a polymer layer, and a use for preparation of a composite thereof.

Another object of the present invention is to provide a method of preparing a flaky-graphite-based complex having excellent dispersibility in a polymeric resin.

Technical Solution

For achieving the objects, the present invention provides a flaky-graphite-based complex including flaky graphite having crystallized nanoparticles chemically bonded to the surface thereof at a high density, a layer of a catecholamine, and a layer of a polymer.

Particularly, in the present invention, the polymer layer is formed by reinforcing cohesion with a polymer without degradation of intrinsic properties of flaky graphite by modifying the surface of flaky graphite with a catecholamine. In such a case, when a polymer composite is prepared, the complex may be evenly dispersed in a polymeric resin. In this case, it is preferable that the catecholamine be coated so as to have a thickness of 10 to 100 nm.

Flaky graphite used in the present invention is a nanoparticle/flaky graphite-fused complex in which crystallized nanoparticles are chemically bonded to the surface of flaky graphite at a high density. In this case, the crystallized nanoparticles have an average diameter of 10 to 500 nm, preferably, 10 to 100 nm, are included at 5 to 50 wt %, preferably, 20 to 50 wt % with respect to the entire flaky graphite, and cover 10 to 70% (coverage) of a surface area of the entire flaky graphite, and preferably 30 to 70%. Also, available nanoparticles are preferably one or more particles selected from the group consisting of Ni, Si, Ti, Cr, Mn, Fe, Co, Cu, Sn, In, Pt, Au, Mg, and a combination thereof. In an embodiment of the present invention, Ni and Si are used.

In addition, the catecholamine may be selected from the group consisting of dopamine, dopamine quinone, α-methyldopamine, norepinephrine, epinephrine, α-methyldopa, droxidopa, indoleamines, serotonin, and 5-hydroxydopamine. Dopamine is preferably used.

The polymer may be selected from the group consisting of a thermosetting resin, a thermoplastic resin, and rubber. Here, the thermosetting resin is preferably selected from the group consisting of an epoxy-based resin, a urethane-based resin, a melamine-based resin, a polyimide-based resin, and a mixture thereof, and the thermoplastic resin is preferably selected from the group consisting of a polycarbonate-based resin, a polystyrene-based resin, a polysulfone-based resin, a polyvinyl chloride-based resin, a polyether-based resin, a polyacrylate-based resin, a polyester-based resin, a polyamide-based resin, a cellulose-based resin, a polyolefin-based resin, a polypropylene-based resin, a polyketone-based resin, a polyphenyl-based resin, a liquid crystal polymer-based resin, and a mixture thereof.

In another aspect of the present invention, a method of preparing a flaky-graphite-based complex, which includes the following processes, is provided.

(i) preparing a nanoparticle/flaky graphite-fused complex having crystallized nanoparticles chemically bonded to the surface thereof at a high density, (ii) coating the nanoparticle/flaky graphite-fused complex with a catecholamine, and (iii) bonding the catecholamine and a polymer by adding a nanoparticle/flaky graphite-fused complex coated with the catecholamine into a polymeric resin solution.

Detailed description of the nanoparticle/flaky graphite-fused complex, the catecholamine, and the polymeric resin is the same as described above.

In this case, the coating in the (ii) step may be performed using a liquid-based preparation (dip-coating) method or a dry plasma polymerization method. Also, the (iii) step may be performed by preferably selecting an in-situ polymerization method, a solution mixing method, a melt mixing method, etc.

The flaky-graphite-based complex according to the present invention, which is prepared by these methods, is used to prepare a polymer composite. In this case, since a surface is functionalized without degradation of intrinsic properties of flaky graphite (such as high thermal conductivity, electrical conductivity, etc.), dispersibility is improved by inducing a chemical reaction with a polymeric resin, a thermal conductivity property is maximized by improving interfacial adhesion, and fluidity is improved by reducing an effective content of flaky graphite itself in a complex (decreased by approximately 20%) by fusion with nanoparticles, thereby providing a flaky-graphite-based composite having excellent mechanical, electrical effects. Therefore, the flaky-graphite-based complex can be used for various electronic devices, etc. in many different ways.

The present invention also includes a use of the flaky-graphite-based complex used to prepare a polymer composite.

Therefore, in still another aspect, the present invention provides a method of preparing a polymer composite, which includes dispersing the flaky-graphite-based complex in a polymeric resin, and a composite prepared as thus.

Particularly, a type of a polymer constituting the flaky-graphite-based complex is preferably the same type as the polymeric resin used in the dispersion when a composite is prepared.

The present invention also includes various uses of the flaky-graphite-based composite.

Advantageous Effects

As such, the present invention relates to a complex to which a polymer layer is bonded by modifying, with a catecholamine, the surface of a flaky graphite-fused complex having a structure in which nanoparticles are crystallized on the surface thereof at a high density. Particularly, the complex is capable of being evenly and homogeneously dispersed in a polymeric resin, and therefore can be usefully used to prepare a flaky-graphite-based polymer composite having excellent properties such as conductivity, thermal conductivity, and the like.

DESCRIPTION OF DRAWINGS

FIG. 7 is a schematic diagram of configuration of a catecholamine/flaky-graphite-based complex according to the present invention.

MODES OF THE INVENTION

Figure 1:
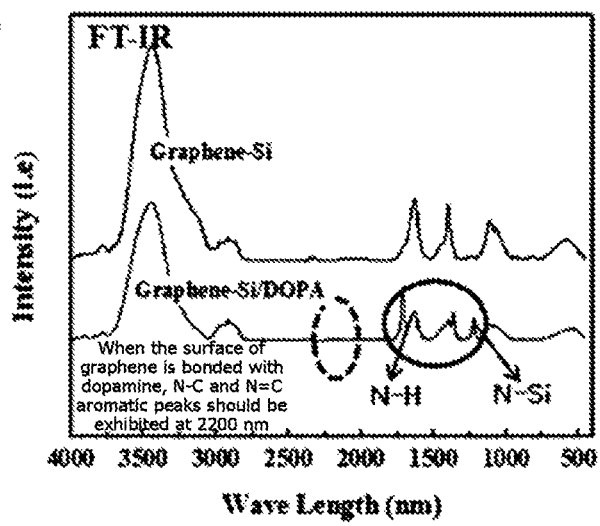
FIG. 1 illustrates results of a FT-IR spectrum (A) and an XPS spectrum (B) of a Si/flaky graphite-fused complex coated with polydopamine, and images (C) of a Ni/flaky graphite-fused complex coated with polydopamine.
Figure 1:
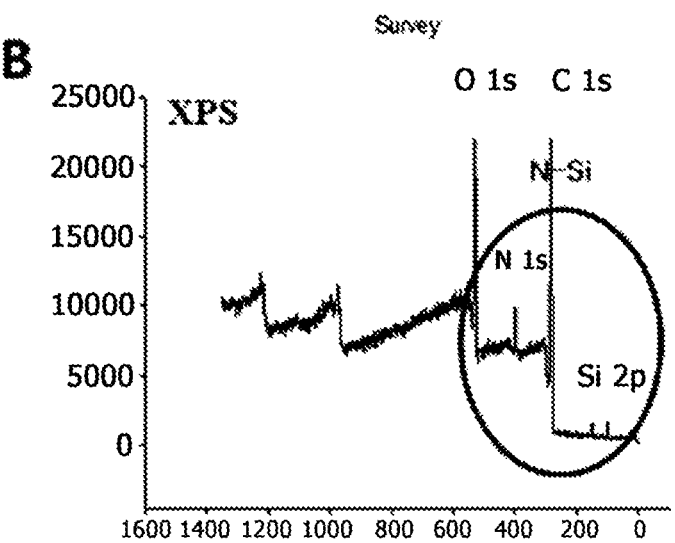
Figure 1:
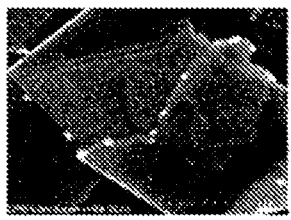
Figure 1:
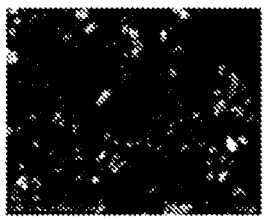
Figure 1:
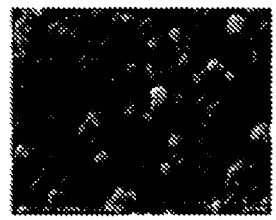

Hereinafter, the present invention will be described in more detail.

In order to prepare a polymer complex having excellent properties, flaky graphite should form a uniformly dispersed phase in a polymeric resin and a strong interfacial bond with a polymer. However, since pure flaky graphite is not well dispersed in a polar organic solvent and has low compatibility with a polymeric resin, a prepared complex exhibits a phase-separated state.

That is, when flaky graphite is dispersed in a polymeric resin, it is difficult for flaky graphite to be uniformly dispersed in a polymeric resin, and also since the viscosity of a polymeric resin rapidly increases in a mixing process, it is difficult for flaky graphite to be uniformly dispersed. Therefore, it is very difficult to add a sufficient amount of flaky graphite to obtain excellent mechanical properties of a prepared complex. When flaky graphite does not form a uniformly dispersed phase in a polymeric resin and an interfacial bond, a phenomenon in which flaky graphite is agglomerated occurs, and as a result, a crack, a pore, a pin hole, and the like are formed in a complex, which results in a great decrease in electrical conductivity and mechanical strength of a complex.

Therefore, modification of the surface of flaky graphite is necessarily required to use filler in a polymeric resin as flaky graphite. Currently, much research on modification of the surface of flaky graphite by a covalent bond or a non-covalent bond is being attempted in order to solve these problems.

The present invention relates to a flaky-graphite-based complex that can be used to prepare such a flaky-graphite-based polymer composite. Particularly, when a complex to which a polymer is stably bonded by modifying, with a catecholamine, the surface of flaky graphite is prepared, and then is dispersed in a target polymeric resin, preferably, in the same type of a polymeric resin as the one that is bonded to the complex, the complex is homogeneously and evenly dispersed in the polymeric resin, thereby a composite having excellent functionality in terms of conductivity, thermal conductivity, etc. can be obtained.

Therefore, in an aspect, the present invention relates to a flaky-graphite-based complex including flaky graphite having crystallized nanoparticles chemically bonded to the surface thereof at a high density, a catecholamine layer, and a polymer layer.

Flaky Graphite

Flaky graphite used in the present invention is composed of a "nanomaterial/flaky graphite-fused complex" in which crystallized nanoparticles are chemically bonded to the surface of flaky graphite at a high density.

Graphite, a mineral formed by laminating layers which are composed of planar large molecules made by indefinitely connecting 6-membered carbon rings on a plane, is composed of graphene as a basic element. Graphene is a single-atom-thick planar sheet of $sp^2$-bonded carbon atoms which are densely packed in the form of a honeycomb lattice, the carbon-carbon bond length in graphene is approximately 0.142 nm, and it is the basic structural element of some allotropes of carbon including graphite, carbon nanotubes, carbon fibers, and fullerenes. Graphite may be one of amorphous graphite, flaky graphite, expanded graphite made by expanding flaky graphite, and spheroidal graphite made by spheroidizing flaky graphite.

"Flaky graphite" or "graphite sheet" used herein includes such a single-layered carbon sheet and a plate-shaped lamellar structure made by laminating single-layered carbon sheet, and exfoliated graphite nanosheets are formed by weak interactions between layers. The flaky graphite also includes a material present as a part of a material capable of including a carbon layer and a carbon sheet. Graphite exhibits electrical and thermal anisotropy due to in-plane metallic bonding and weak van der Waals interactions between interspaced layers.

Flaky graphite that can be used in the present invention can be obtained by various methods known in the art. For example, there is a method of preparing single crystal flaky graphite by forming a thermosetting resin such as polyimide in the form of a film to have a thickness of 25 μm or less and then graphitizing at a high temperature of 2500° C. or more, or a method of obtaining highly oriented graphite through chemical vapor deposition (CVD) by thermally decomposing a hydrocarbon such as methane at a high temperature.

"Nanomaterial/flaky graphite" used herein refers to a fused complex in which nanomaterials, preferably, nanometallic particles, are homogeneously crystallized on the surface of the flaky graphite at a high density. Particularly, the crystallized nanoparticles have an average diameter of 10 to 500 nm, preferably, 10 to 100 nm, are included at 5 to 50 wt %, preferably, 20 to 50 wt % with respect to the entire flaky graphite flake, and cover 10 to 70% (coverage) of a surface area of the entire flaky graphite, and preferably 30 to 70%.

The nanomaterials (nanoparticles) used in the present invention may be metal materials or non-metal materials which are present in a solid state at room temperature. For example, the nanomaterials (nanoparticles) may be selected from alkali metals, alkaline earth metals, lanthanides, actinides, transition metals, post-transition metals, metalloids, etc. in the periodic table of the elements. Preferably, the nanomaterials (nanoparticles) are alkali metals, alkaline earth metals, lanthanides, actinides, or transition metals as metal materials. As a specific example, the nanoparticles may be selected from Ni, Si, Ti, Cr, Mn, Fe, Co, Cu, Sn, In, Pt, Au, Mg, or a combination thereof, and more preferably Cu, Ni, or Si. In an embodiment of the present invention, Si and Ni are used. Preparation of a nanomaterial (nanoparticle)/flaky graphite-fused complex may be referenced from Korean Patent No. 10-1330227.

In regard to the application of graphite, a decrease in chemical reactivity on a surface (basal plane) has been regarded as a big problem so far. A bonding site in which a chemical reaction may take place is present not on the surface of flaky graphite but at the edge of flaky graphite and a defect part in the surface of flaky graphite. Therefore, chemical reactivity is lower on the surface of flaky graphite than at the edge and a defect part of flaky graphite due to this bonding site in which a chemical reaction may take place. For this reason, when pure flaky graphite is generally dispersed in a polymeric resin, since it is difficult for pure flaky graphite to form a strong interfacial bond with a polymeric resin, there is a problem in which pure flaky graphite is not well dispersed.

For solving this problem, in the present invention, the surface of flaky graphite is modified using a catecholamine capable of highly improving bondability with a medium by forming a strong interfacial bond with a polymeric resin without degradation of intrinsic properties of flaky graphite.

However, even when a catecholamine is used, there is a problem in which cohesion between pure flaky graphite and a catecholamine is low. Although the surface of flaky graphite is modified by an oxidized functional group and the like, there is still a limitation of improving cohesion therebetween.

However, in the present invention, these problems are solved by using the nanoparticle/flaky graphite-fused complex in which crystallized nanoparticles are chemically bonded to the surface of flaky graphite at a high density. That is, a catecholamine coating layer is formed on the surface of flaky graphite by bonding a catecholamine to the crystallized nanoparticles, a polymer is bonded to the coating layer, and as a result, the complex will be evenly and homogeneously dispersed in a polymeric resin later. That is, the present invention provides a complex for preparation of a composite, which is composed of a nanoparticle/flaky graphite-fused complex, a catecholamine layer, and a polymer layer and has remarkably improved dispersibility in a polymeric resin.

In addition, it is possible to improve fluidity of the complex since an effective content of flaky graphite itself in the complex and the composite may be decreased by using the nanoparticle-fused flaky graphite. A content of flaky graphite may be decreased by approximately 20%. Here, a decrease by 20% corresponds to contents of an included nanomaterial and a catecholamine to be described below.

Surface Modification with Catecholamine

That is, the surface of a nanomaterial (nanoparticle)/flaky graphite-fused complex according to the present invention is modified by being coated with a catecholamine.

The surface modification is performed to form a strong interfacial bond with a polymer using high adhesion of a catecholamine, thereby obtaining a complex to which a polymer layer is stably bonded.

Further, when a flaky-graphite-based complex is dispersed in a polymeric resin selected depending on the purpose, dispersibility is remarkably improved without degradation of intrinsic properties of flaky graphite.

A "catecholamine" refers to a single molecule that has a hydroxyl group (—OH) as an ortho-group and various alkylamines as a para-group in a benzene ring. The catecholamine includes, as various derivatives from this structure, dopamine, dopamine quinone, α-methyldopamine, norepinephrine, epinephrine, α-methyldopa, droxidopa, indoleamines, serotonin, 5-hydroxydopamine, etc. Dopamine is most preferably used.

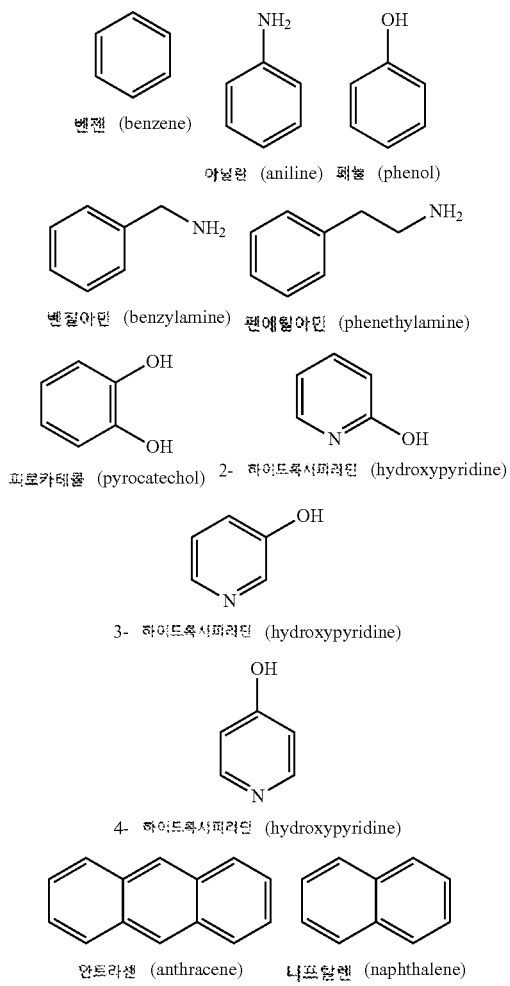

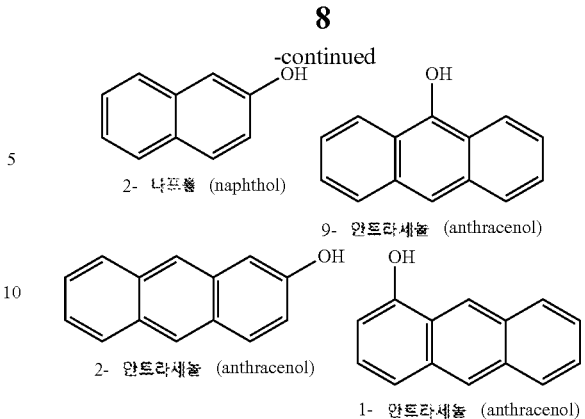

"Dopamine" that is one of neurotransmitters secreted from nerve terminals is a very important material to the extent that about half of neurohormones produced in the human brain are related to dopamine. Functional surface modification using dopamine that is a single molecular material composed of catechol, an important chemical functional group exhibiting adhesion in mussel adhesive protein, was reported in 2007. Dopamine is a single molecular material having a molecular weight of 153 (Da) and has catechol and an amine functional group. It is known that when a material to be surface-modified is immersed in a dopamine solution having a basic pH condition (approximately pH 8.5), which is the same condition as in the sea, for a predetermined time and then is taken out of the solution, a polydopamine (PDA) (Chemical Formula 1) coating layer is formed on the surface of the material by oxidation of catechol.

[Chemical Formula 1]

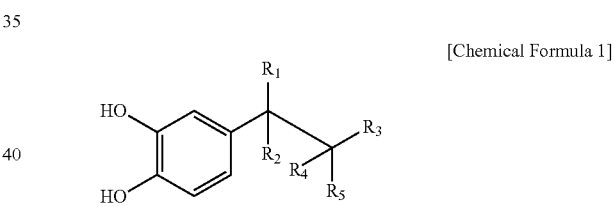

(In Chemical Formula 1, at least any one of $R_1$, $R_2$, $R_3$, $R_4$, and $R_5$ is one type selected from the group consisting of a thiol, a primary amine, a secondary amine, a nitrile, an aldehyde, an imidazole, an azide, a halide, polyhexamethylene dithiocarbonate, a hydroxyl, a carboxylic acid, a carboxylic ester, or a carboxamide, and the remaining $R_1$, $R_2$, $R_3$, $R_4$, and $R_5$ are hydrogen)

As above described, it is difficult for the surface of pure flaky graphite to be coated with a catecholamine layer, but the flaky graphite-fused complex according to the present invention has crystallized nanoparticles bonded to the surface thereof at a high density, and a catecholamine compound such as polydopamine and the like is bonded to the crystallized nanoparticles, thereby stably forming a catecholamine coating layer.

The catecholamine may be used to coat the surface of flaky graphite using a liquid-based preparation (dip-coating) method or a plasma polymerization method. Particularly, the latter is preferably a dry plasma polymerization method.

In the case of using the liquid-based preparation method, for example, a catecholamine may be used to coat the surface of flaky graphite by the following method.

That is, for example, a method including (a) preparing each of a weakly basic dopamine solution and a nanoparticle/flaky graphite-fused complex, (b) dipping the nanoparticle/flaky graphite-fused complex in the weakly basic dopamine solution, and (c) forming a polydopamine coating layer on the surface of the nanoparticle/flaky graphite-fused complex may be used. In this case, a basic Tris buffer solution having a pH of 8 to 14 (100 mM) is used as the weakly basic dopamine solution, and a method of preparing a nanoparticle/flaky graphite-fused complex may be referenced from Korean Patent No. 10-1330227. In the dipping, a dip-coating method may be used. Generally, a material to be coated is immersed in a coating solution to form a precursor layer on the surface of the material to be coated, and then the coating is performed by calcining at an appropriate temperature.

In addition, in the case of using a dry plasma polymerization method, a process is progressed under conditions of radio frequency (RF) power in a high frequency range of 0 to 200 W and a pressure of $1\times10^{-3}$ to $5\times10^{-1}$ Torr. In this case, argon gas is preferably used as a carrier gas and 1 or more gases selected from the group consisting of hydrogen, nitrogen, oxygen, water vapor, ammonia, and a mixed gas thereof are preferably used as an active gas, and most preferably, oxygen or ammonia may be used.

A catecholamine coating layer may be formed by bonding crystallized nanoparticles present on the surface of the nanoparticle/flaky graphite-fused complex and a catecholamine compound such as polydopamine and the like using such methods. A formed catecholamine coating layer has a thickness of approximately 10 to 100 nm.

The nanoparticle/flaky graphite-fused complex according to the present invention may be bonded with various materials by the catecholamine coating layer, and thus excellent fluidity, coatability, and dispersibility may be obtained. That is, the catecholamine coating layer formed using polydopamine and the like has reducing power itself, and simultaneously an amine functional group is covalently bonded to a catechol functional group present on a surface through the Michael addition reaction, thereby secondary surface modification is possible using the catecholamine coating layer as adhesive.

Various materials such as various polymers, biopolymers, polysaccharides, and the like may be immobilized on a surface using such chemical reactivity.

Formation of Complex and Bonding of Polymer Layer

The above-described nanoparticle/flaky graphite-fused complex coated with a catecholamine is added to a polymeric resin, and a polymer layer in which a polymer is bonded to the catecholamine coating layer is formed, thereby preparing a complex according to the present invention.

Therefore, in another aspect, the present invention relates to a method of preparing a flaky graphite/catecholamine-based complex, which includes the following methods.

(i) preparing a nanoparticle/flaky graphite-fused complex having crystallized nanoparticles chemically bonded to the surface thereof at a high density, (ii) coating the nanoparticle/flaky graphite-fused complex with a catecholamine, and (iii) bonding a catecholamine and a polymer by adding the nanoparticle/flaky graphite-fused complex coated with the catecholamine into a polymeric resin solution.

In this case, a description of the nanoparticle/flaky graphite-fused complex and the catecholamine may be referenced from the above description. Preparation of the nanoparticle/flaky graphite-fused complex may be referenced from Korean Patent No. 10-1330227. The flaky graphite is preferably included in an amount of 10 to 30 parts by weight with respect to part by weight of the total complex. In an embodiment of the present invention, 15 parts by weight are used.

As a method of preparing a flaky-graphite-based nanocomplex according to the present invention, appropriate known techniques may be used, and for example, an in-situ polymerization method, a solution mixing method, a melt mixing method, and the like may be used.

The in-situ polymerization method is one of methods for a more stable bond with a polymer resin by adding flaky graphite or functionalized flaky graphite in an intermediate step of polymerization, that is, in a state in which monomers are synthesized. The in-situ polymerization method is advantageous in that cohesion and dispersibility of flaky graphite in a polymeric resin are greatly improved, compared to a method in which a polymer and flaky graphite are mixed later. Also, the in-situ polymerization method is advantageous in that it is possible to charge a high content of flaky graphite and strong interactions between a polymer and flaky graphite may be formed.

In addition, the solution mixing method is a method in which a solution is prepared by dissolving a polymeric resin in a solvent, flaky graphite is added directly or in a dilute form to the solution, and then the solvent is removed to prepare a complex. In the solution mixing method, reactivity of flaky graphite in a polymeric resin may be improved compared to a direct mixing method, but there is a problem in which the method is not environmentally friendly because the use of a large amount of solvent involves removal of the solvent.

The melt mixing method is advantageous in that no solvent is required for preparation of a polymer complex. This method is a method in which flaky graphite or functionalized flaky graphite and a polymer are melted by heat in advance, and then a melted substance is mechanically mixed to prepare a complex. That is, a polymer is primarily melted at temperatures above the melting point of a polymer, and then a melted substance is mechanically mixed with flaky graphite added in the form of powder, all of which is repeated, thereby preparing a complex.

The polymer is not specifically limited to a type thereof, but may be selected from the group consisting of a thermosetting resin, a thermoplastic resin, and rubber. The thermosetting resin is not specifically limited to a type thereof, but may be an epoxy-based resin, a urethane-based resin, an ester-based resin, a polyimide-based resin, or a mixture thereof. Also, the thermoplastic resin is not specifically limited to a type thereof, but may be a polycarbonate-based resin, a polystyrene-based resin, a polysulfone-based resin, a polyvinyl chloride-based resin, a polyether-based resin, a polyacrylate-based resin, a polyester-based resin, a polyamide-based resin, a cellulose-based resin, a polyolefin-based resin, a polypropylene-based resin, a polyketone-based resin, a polyphenyl-based resin, a liquid crystal polymer-based resin, or a mixture thereof. Rubber includes both a rubber elastomer including natural rubber and an analogue thereof.

A schematic diagram of the complex according to the present invention, in which a polymer layer is formed by the above method, is illustrated in FIG. 7.

Use of Complex

In preparation of a polymer composite, the complex according to the present invention is primarily formed, and when the complex is dispersed in a target polymeric resin, the complex is homogeneously and evenly dispersed in the polymeric resin.

That is, since the complex according to the present invention has a polymer layer formed on the surface thereof, both agglomeration caused by low dispersibility of flaky graphite itself and agglomeration caused by high adhesion of a catecholamine layer itself do not occur. Therefore, the complex is uniformly dispersed in a polymeric resin, and as a result, may be usefully used to prepare a composite having excellent mechanical, electrical, and thermal properties.

Therefore, in another aspect, the present invention relates to a method of preparing a polymer composite, which includes dispersing the flaky-graphite-based complex in a polymeric resin, and a polymer composite prepared as thus.

In this case, a polymer used to prepare the composite and a polymer formed on the surface of the complex according to the present invention are not limited in types thereof as long as they have reactivity between each other and are harmonious. But, a type of a polymeric resin used to prepare the composite is preferably the same type as a polymer formed on the surface of the complex according to the present invention or a similar type. The same type of a polymer is most preferably used. Detailed description of a polymer may be referenced from the above description.

Use of Composite

In a composite prepared using the complex according to the present invention, a flaky-graphite-based complex is very homogeneously dispersed, and as a result, excellent properties of flaky graphite can be utilized without change.

Flaky graphite has a charge mobility of a maximum of 200,000 $cm^2/V$ at room temperature. As a result, flaky graphite uniformly dispersed in a polymeric resin is bonded with the polymeric resin to have high current density and thus exhibits high electrical conductivity. Also, when a composite is prepared by dispersing flaky graphite in an insulating polymeric resin rather than a conductive polymeric resin, dispersed flaky graphite forms a conductive channel through which electrons are capable of being transported, and thus an insulating polymer composite exhibits electrical conductivity. In addition, flaky graphite exhibits excellent mechanical properties, and as a result, when flaky graphite is added to a polymeric resin, there is no need to increase a thickness of a composite molded article for obtaining a desired mechanical property value. Therefore, weight can be lessened by reducing the thickness of a component and a material, and as a result, flaky graphite can be utilized for a use of a lightweight/high strength material. Also, flaky graphite has a thermally stable structure due to a stable double bond between carbon atoms, and as a result, even when a small amount of flaky graphite is added to a polymeric resin, the glass transition temperature (Tg) and decomposition temperature of a polymer composite may be improved. In addition, flaky graphite has high thermal conductivity (5000 W/(m·K)), and as a result, when a composite is prepared by charging a polymeric resin with a flaky-graphite-based complex, thermal conductivity of a prepared complex is greatly improved.

Graphite has a thermal expansion coefficient value of $-1.5 \times 10^{-6}/°$ C. in the laminated surface direction and a thermal expansion coefficient value of $2.7 \times 10^{-5}/°$ C. in the axis direction at room temperature. Such thermal expansion coefficient values are very low values, compared to those of pure polymers, and as a result, when a composite is prepared by dispersing a flaky-graphite-based complex in a polymeric resin, a phenomenon in which a polymeric resin is rapidly expanded is mitigated, and thus a prepared composite may have dimensional stability. This is a very important consideration in preparation of a polymer molded article. When a polymer molded article is prepared by injecting a melted polymer into a mold and then cooling the molded article, a phenomenon in which the molded article is rapidly contracted when a molded article is cooled is prevented due to a low thermal expansion coefficient value, and thus it is possible to prepare a polymer molded article having uniform dimensions. Generally, in order to decrease a thermal expansion coefficient, a composite is prepared by adding carbon-based flaky graphite. A research result in which a complex prepared by charging with flaky graphite exhibits superior dimensional stability to a composite prepared by adding other carbon-based fillers was reported.

In addition, when flaky graphite is unidirectionally oriented in a polymeric resin, dispersed flaky graphite acts as a barrier in a place where a gas passes, and thus a length through which a gas passes is lengthened to improve the gas barrier property of a complex.

Applicability of a flaky graphite/polymer composite is focused in various fields due to such properties, and also, the possibility of various applications has been opened up by the introduction of mass production technology of flaky graphite.

Component of Electronic Device and Energy Storage Medium

Utilizing the electrical conductivity of flaky graphite, flaky graphite can be used as a semiconductor chip tray, a wafer container, a static dissipative area (0.1 to 1 kΩ/sq), and the like, and also can be applied in an energy storage medium field such as a supercapacitor and the like for providing antistatic properties (1 kΩ/sq).

Organic Solar Cell

A flaky graphite material has very high transparency (97.7% for a single layer), excellent mechanical strength (25% strain), and very high conductivity (6,000 S/cm), and as a result, can be usefully applied for an organic solar cell.

Heat Dissipating Material

While miniaturization and slimming of digital devices are rapidly progressed, the dissipation of heat generated from electronic components has been regarded as a big problem. In particular, the development of lightweight heat-dissipating materials is greatly required in the light emitting diode (LED) lighting field. Currently, metals are mainly used as heat-dissipating materials but have a limitation in reducing weight and cost. Flaky graphite in the form of a flake, which is prepared using graphite, is a material capable of providing both an excellent heat dissipation property and economic efficiency, and therefore can be used as heat-dissipating materials enabling replacement of existing metal heat-dissipating materials.

Film Packaging Material

Since flaky graphite has a two-dimensional plate structure, when a complex is prepared by dispersing flaky graphite in a polymer, dispersed flaky graphite acts as a barrier that blocks permeation of a gas, and thus gas permeability is rapidly reduced. Also, even when a small amount of flaky graphite is dispersed, a complex exhibits an excellent gas barrier property, and therefore flaky graphite can be utilized as film packaging materials in fields where a gas barrier property is required such as food packaging materials or film packaging materials of electronic products for preventing oxidation reactions.

Biomimetic Application Device

Since a microactuator manufactured using electrical, mechanical, and thermal properties of flaky graphite has large displacement and a fast response speed even at low power, exhibits excellent properties in which displacement increases based on an increase in a temperature, and is easily manufactured, it is possible for flaky graphite to be utilized as muscle or various biomimetic application devices.

In this way, the flaky-graphite-based polymer complex and the composite using the same according to the present invention can be used in various fields such as the electronics industry, the energy industry, the automobile/aerospace industry, etc.

Herein, the present invention will be described in more detail with reference to embodiments. The following embodiments are merely presented to exemplify the present invention, and it should be understood by those skilled in the art that the range of the present invention is not limited to the following embodiments.

Embodiment 1: Preparation of Graphite (Flaky Graphite)/Silicon (Si)-Fused Nanocomplex Nanosilicon/flaky graphite flakes were prepared in an analogous manner to a method disclosed in Korean Patent No. 10-1330227.

Raw powder was prepared by mixing silicone (Si) and graphite using a mixer for 10 minutes, and 30 lpm and 50 lpm of argon gas were injected into a high frequency thermal plasma device for proceeding the preparing process according to the present invention as the central gas and the sheath gas, respectively. Afterward, high temperature thermal plasma was generated by applying 17 kW as power source of a plasma torch, and then the degree of vacuum of the device was maintained to be 500 Torr before the raw powder was injected. The raw powder mixed with graphite was injected into a high frequency thermal plasma reacting portion through a jet nozzle of a plasma generating electrode portion. Graphite passed without heat loss caused by the plasma, and only silicon (Si) powder was crystallized into nanopowder through a selective evaporation process to be bonded with graphite in the reacting portion.

This bonded graphite/silicon (Si)-fused nanocomplex powder was separated in a cyclone portion, was absorbed onto a filter of a collector through a conveying pipe, and the powder absorbed onto the filter was captured in a collecting portion through a blowback process.

Embodiment 2: Flaky Graphite Coated with Dopamine and Polymer Complex 2-1. The Coating of Flaky Graphite with Dopamine 10 mM dopamine was dissolved in a 100 mM Tris buffer solution (TBS), 5 g of Si-fused flaky graphite was added to 1 L of the solution, and then a resulting solution was stirred at room temperature under atmospheric conditions for 2 hours. In order to increase a reaction rate of dopamine with Si present on flaky graphite, a catalyst (oxidant) was added in an amount corresponding to 10% of a dopamine content and then a resulting solution was stirred.

The stirred solution was filtered to remove unreacted substances after the stirring was performed for 2 hours, washed with deionized (Di) water twice, and then dried at room temperature to prepare a flaky graphite fused complex coated with polydopamine. The fused complex was confirmed through a FT-IR spectrum and an XPS spectrum (FIG. 1).

It was confirmed that even when an analogous process was performed using Ni, the surface of flaky graphite was successfully coated with dopamine (FIG. 1C).

2-2. Preparation of Complex

In order to prepare a nanocomplex using flaky graphite (M50, XG Science Inc.) coated with dopamine and polypropylene, the two substances were mixed using an internal mixer (free volume 125 CC, counter-rotation) at 230° C. for 10 minutes. Here, flaky graphite was added at 15 wt % with respect to an entire complex, and PP-g-MAH was added for improving dispersibility to induce a chemical reaction with dopamine present on the flaky graphite.

Embodiment 3: Verification of Various Characteristics

As in Embodiment 2, in order to prepare the complex according to the present invention, Korea Petrochemical 1156 grade (MI: 60 g/10 min) was used as polypropylene. A flaky-graphite-based complex was prepared using variously functionalized flaky graphite through a melt mixing method, and the complex was dispersed in a polypropylene-based resin to prepare a flaky-graphite-based composite. First, various characteristics of the complex were evaluated.

3-1. Raman Shift

Figure 2:
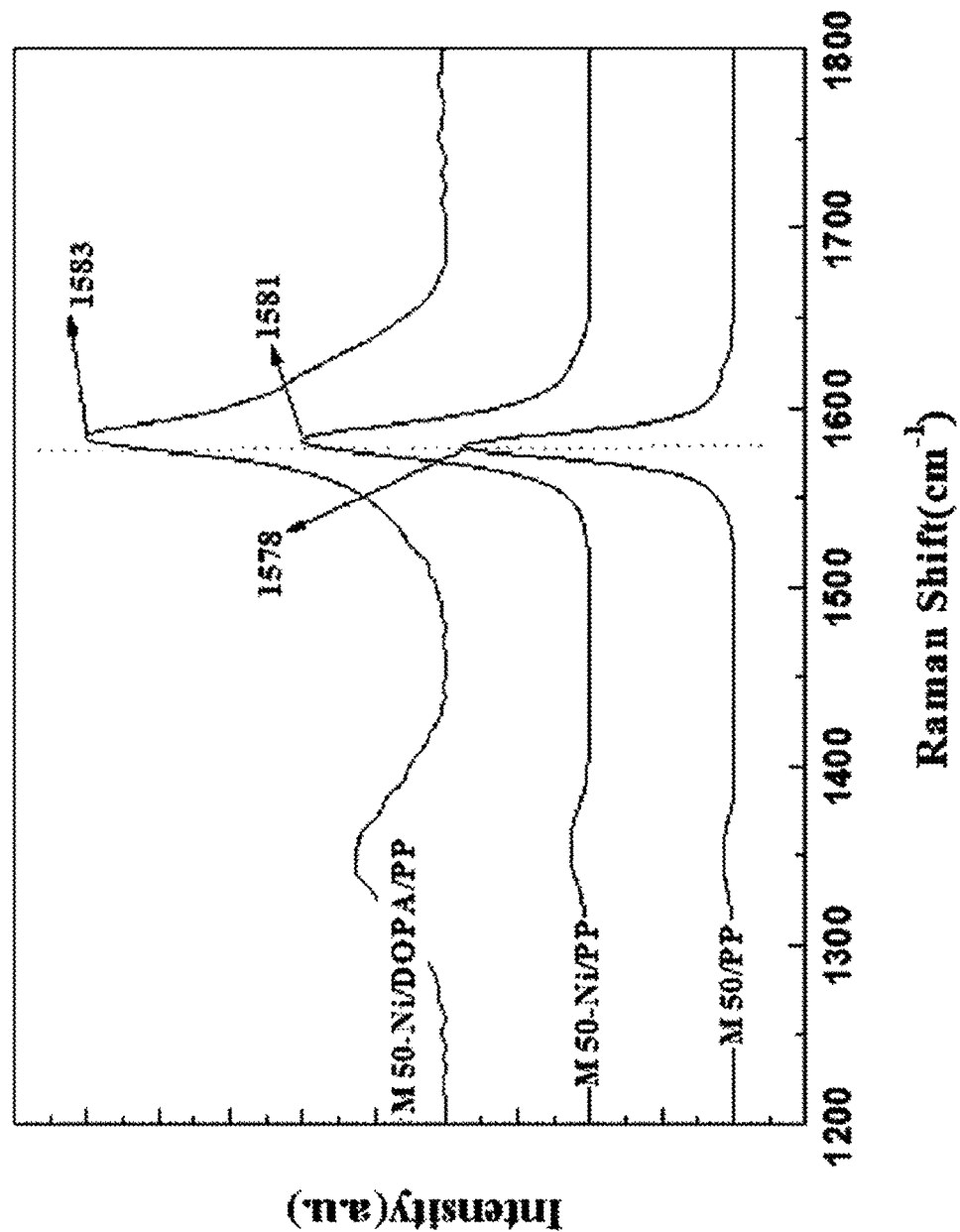
FIG. 2 illustrates a Raman shift measurement result of flaky graphite, a Ni/flaky graphite-fused complex, and a Ni/flaky graphite-fused complex coated with polydopamine.

A Raman shift result measured when each of flaky graphite, a flaky graphite/Ni particle-fused complex, and a flaky graphite/Ni particle-fused complex treated with dopamine was combined with polypropylene is illustrated in FIG. 2.

As a result, as shown in FIG. 2, it can be seen that M50 exhibited a G band peak at 1578 $cm^{-1}$ which is a characteristic peak of graphite (G band peak), a fused complex by Ni fusion exhibited a broader peak than pure flaky graphite, and the peak of the fused complex was shifted to the right, compared to pure flaky graphite.

In this case, the broader peak indicates that dispersibility of flaky graphite particles is improved by fusing flaky graphite with nickel (Ni), and the peak shifted to the right indicates that interactions between nickel (Ni) present on flaky graphite and flaky graphite increase.

Based on this experiment, it can be seen that when flaky graphite was fused with nickel (Ni) and then the fused flaky graphite was coated with dopamine, the width of a characteristic peak of flaky graphite was widened 3 times or more and a peak position was shifted by 5 $cm^{-1}$ or more to the right.

From these results, it can be seen that interactions occurring by a chemical bond of dopamine, polypropylene, and flaky graphite was greatly improved and dispersibility of a polypropylene complex in polypropylene was maximized due to the dopamine coating.

3-2. XRD Analysis

Figure 3:
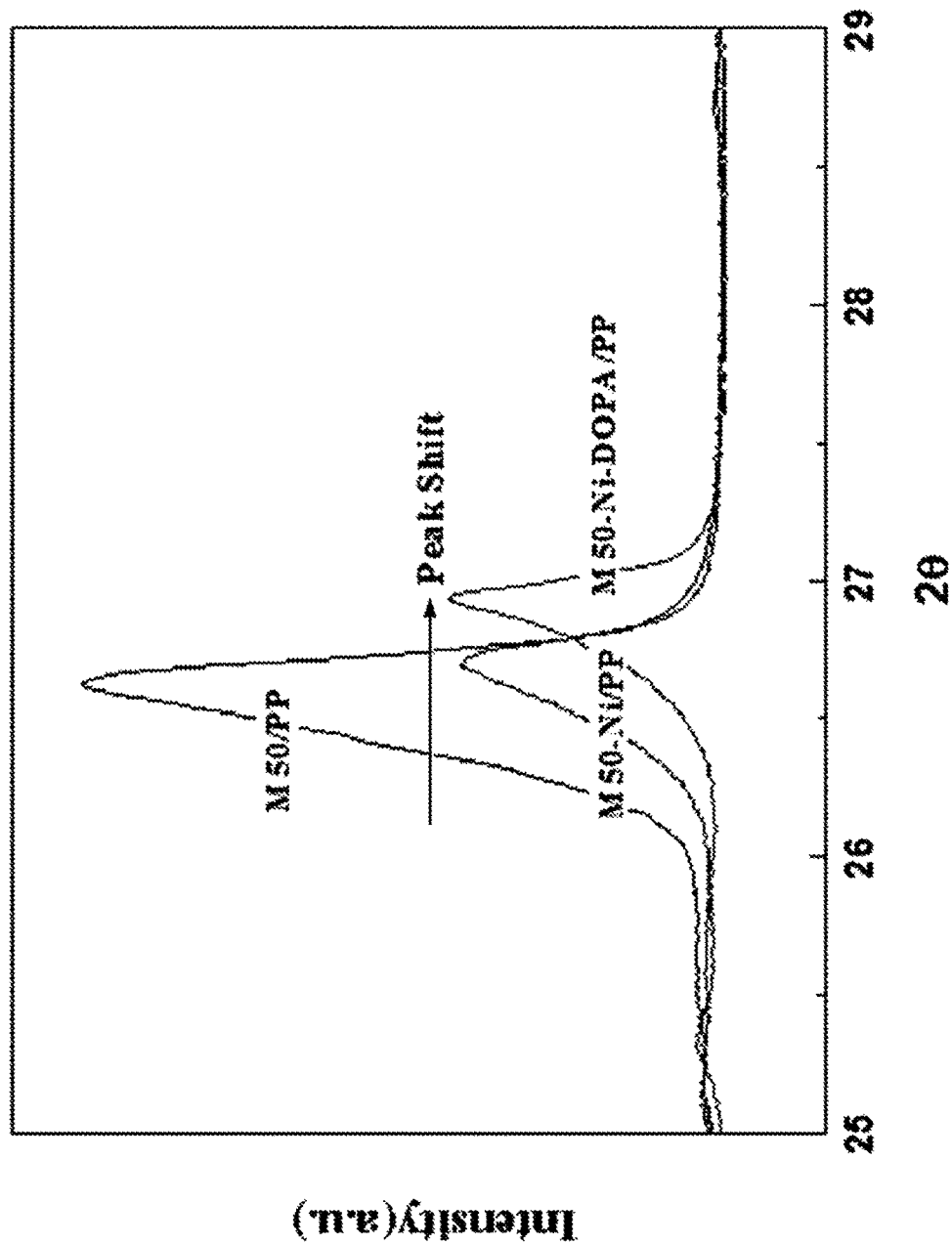
FIG. 3 illustrates an XRD measurement result for analyzing an interval of flaky graphite in preparation of a complex with polypropylene according to a type of flaky graphite.

An XRD measurement result for analyzing an interval of flaky graphite in preparation of a complex with polypropylene according to a type of flaky graphite is illustrated in FIG. 3.

As a result, in the case of a composite prepared by coating flaky graphite with dopamine, it can be seen that in a complexation process with polypropylene, an interval between layers remarkably decreased. This is considered as a result from minimization of pores present on joint interfaces between flaky graphite and polypropylene as a gap between flaky graphite is coated with dopamine.

3-3. Thermal Conductivity Property

Figure 4:
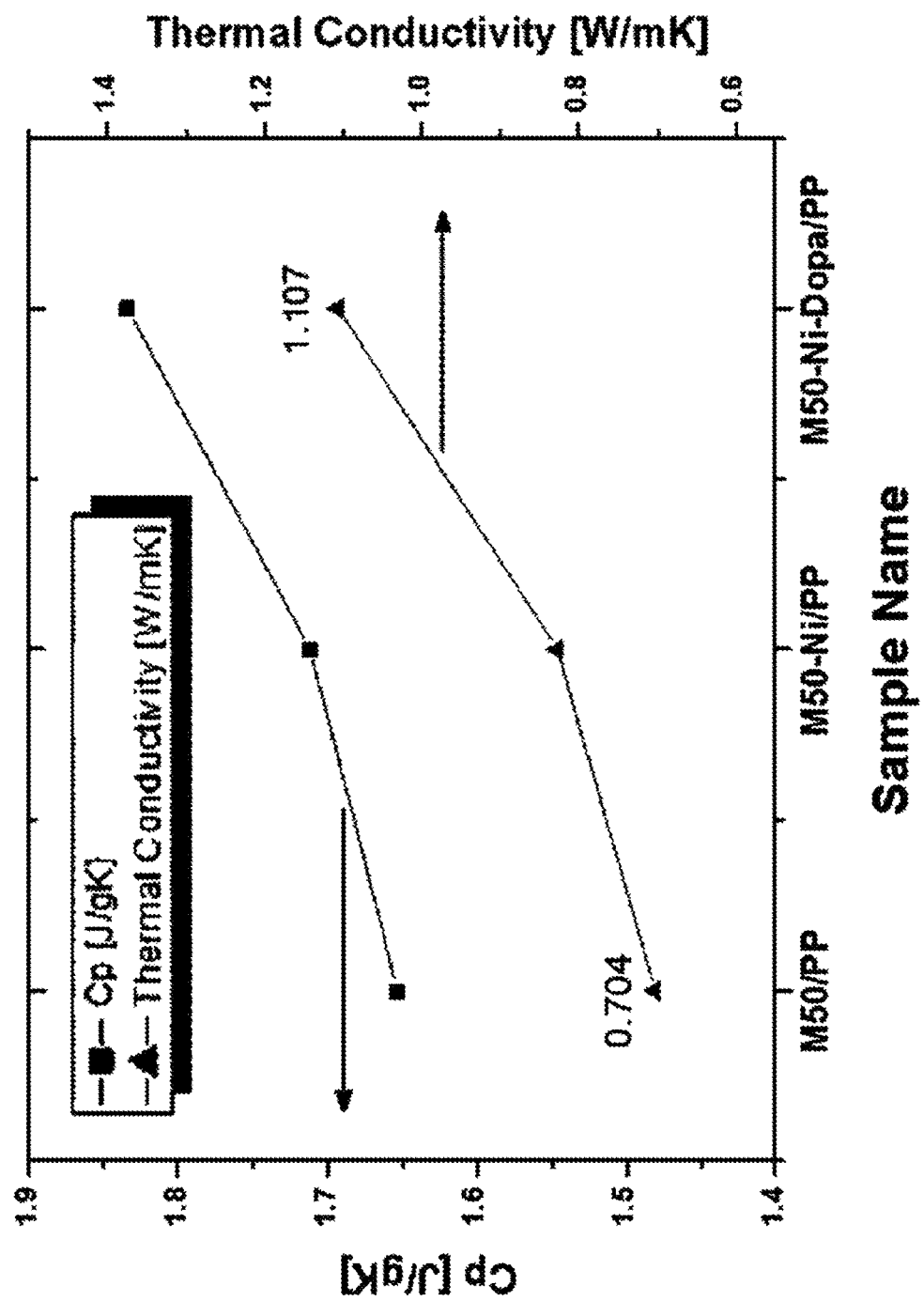
FIG. 4 illustrates a thermal conductivity property of flaky graphite treated with dopamine.

FIG. 4 illustrates a thermal conductivity property of a composite prepared using a flaky graphite complex based on treatment with dopamine.

As shown in FIG. 4, when 15% of pure flaky graphite was added, vertical thermal conductivity was only 0.7 W/mK, but when the complex according to the present invention was used, vertical thermal conductivity was 1.107 W/mK, which is a value improved by approximately 60%, as dispersibility was improved and pores present on joint interfaces between flaky graphite and polypropylene were minimized by treatment with dopamine.

Although an effective content of flaky graphite that is a main factor affecting thermal conductivity was low, thermal conductivity was improved by 60%. This is considered as an influence of Ni (18%) and dopamine (0.5%) present on flaky graphite, and this improvement effect is remarkable.

In addition, as thermal conductivity was improved, when a flaky graphite complex treated with dopamine was used, melt flowability was improved by 50% or more, compared to when only flaky graphite is added. This is a very meaningful result through which the prediction that when injection molding is performed using the composite prepared using the complex according to the present invention later, productivity of a product will be improved and simultaneously properties will be improved is possible.

3-4. Dispersibility

Figure 5:
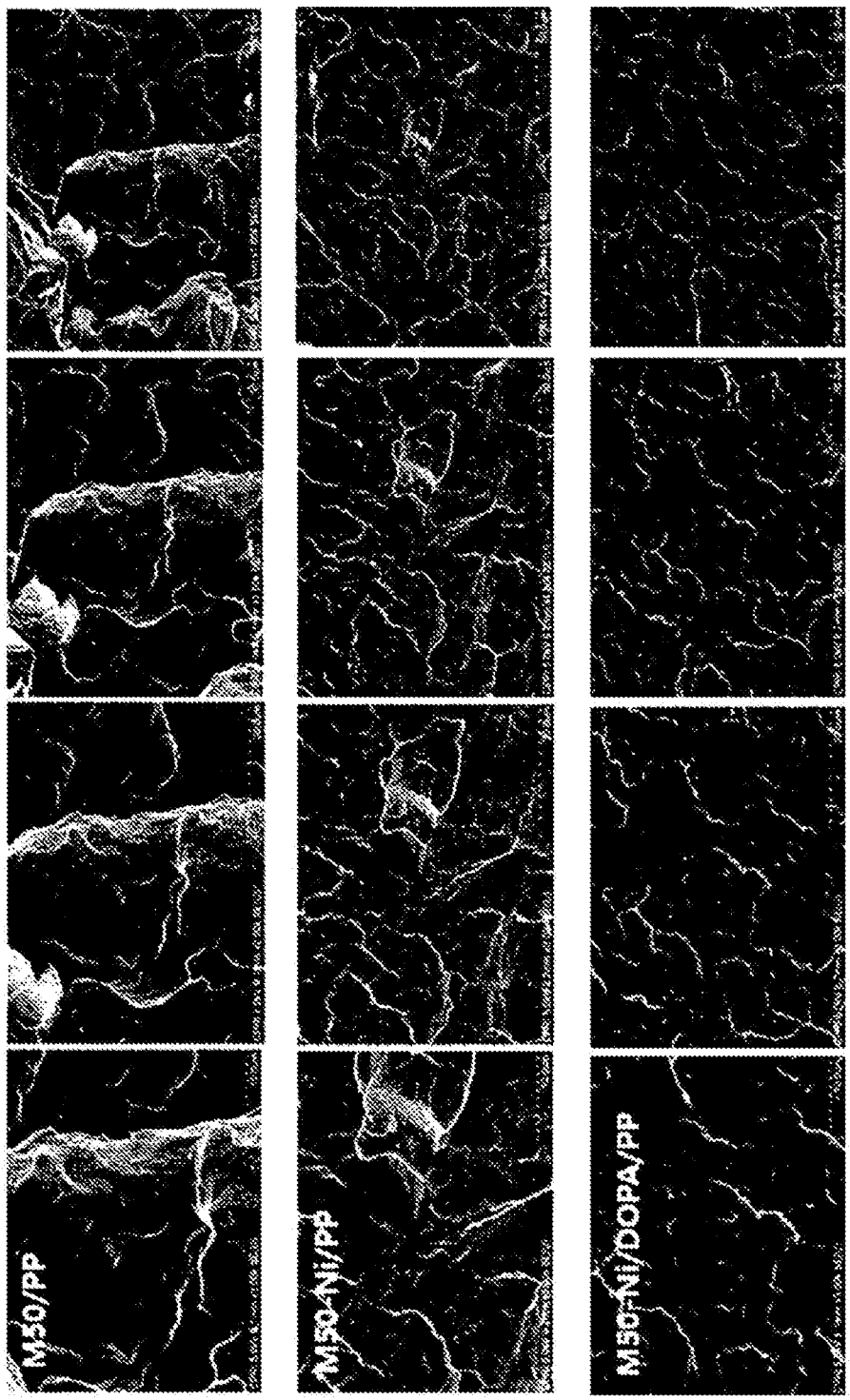
FIG. 5 illustrates SEM images for checking the degree of dispersion of a polypropylene/flaky graphite complex in a used composite.

A SEM image for checking the degree of dispersion by complexation of various types of flaky graphite and polypropylene is illustrated in FIG. 5.

In the case of pure flaky graphite, graphite particles are present in the form of a very large aggregate, but in the case of a flaky graphite complex treated with dopamine, graphite particles are maintained in an evenly dispersed phase in a polypropylene matrix. From this result, it is expected that as dispersibility is improved, thermal conductivity is also improved.

3-5. Chemical Bond (FT-IR)

Figure 6:
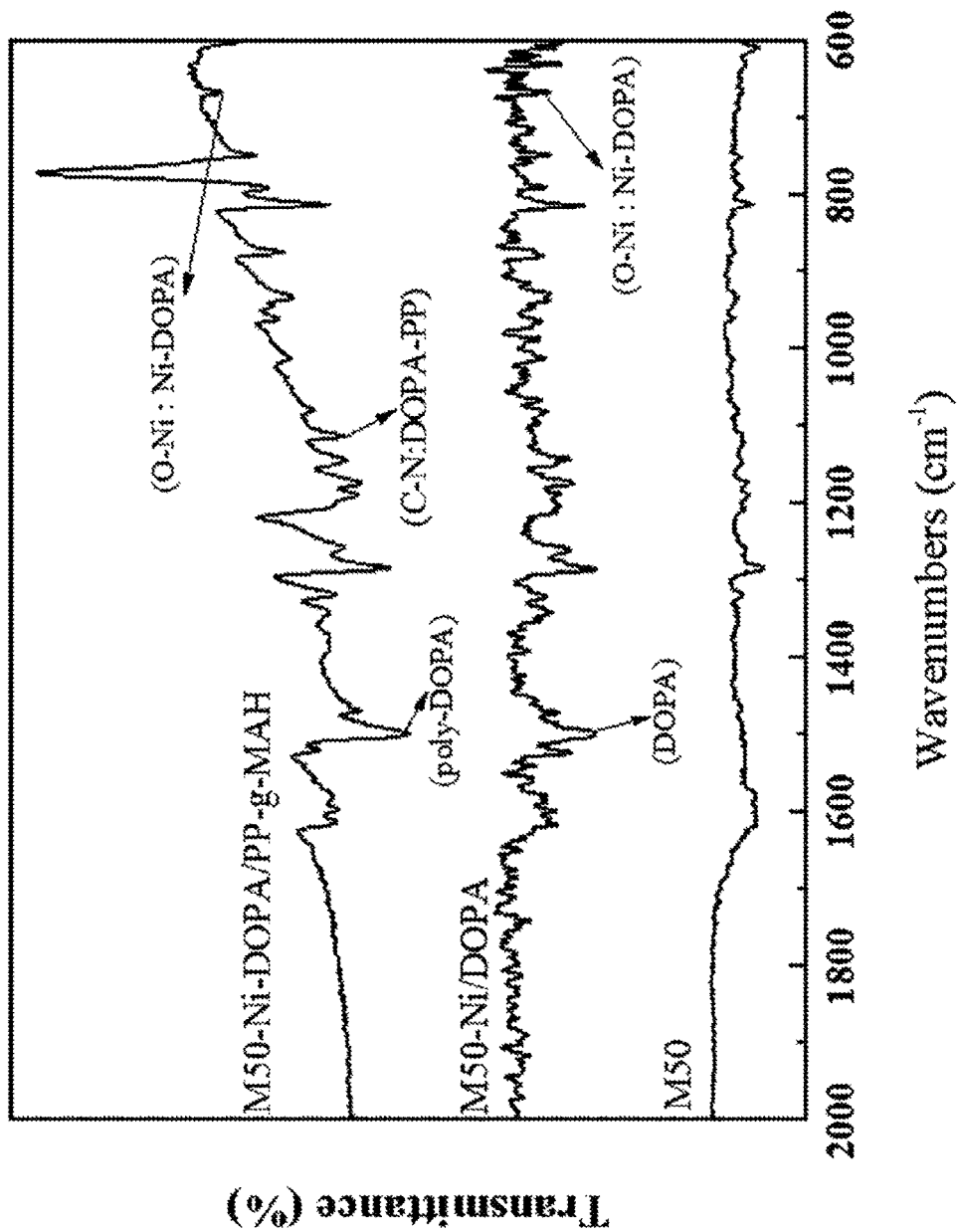
FIG. 6 illustrates a FT-IR measurement result showing that flaky graphite coated with dopamine according to the present invention and polypropylene(PP-g-MAH) are chemically bonded.

A FT-IR result showing that polydopamine bonded to Ni and polypropylene as a polymer are chemically bonded after a flaky graphite (M50)/Ni-fused complex was coated with polydopamine through a chemical bond is illustrated in FIG. 6.

As a result, it can be seen that a M50/Ni-fused complex was coated with polydopamine through a chemical bond (1500 cm$^{-1}$), and also a chemical bond was formed between the polydopamine and polypropylene (1115 and 667 cm$^{-1}$).

From this result, it can be seen that flaky graphite is capable of being evenly dispersed in a polypropylene matrix later by chemically bonding polydopamine present on a flaky graphite/Ni-fused complex with polypropylene, and therefore it is expected that thermal conductivity is capable of being greatly improved.

3-6. Melt Index (MI, Capillary Rheometers) of Complex

Melt index of the complex according to the present invention was evaluated.

TABLE 1

| Sample | M50/PP | M50-Ni/PP | M50-Ni-DOPA/PP |
|---|---|---|---|
| MI (g/10 min) | 3.53 | 5.31 | 7.68 |

As described in Table 1, when the flaky graphite/Ni-fused complex according to the present invention was treated with dopamine (M50-Ni-DOPA/PP), at least a two-fold higher melt index was exhibited compared to a control group, a pure flaky graphite/PP complex (M50/PP).

In addition, it can be seen that when treatment with dopamine was performed, a content of flaky graphite decreased 20 wt % compared to a control group, and as flaky graphite was oriented in an orientation direction of a polypropylene chain by a chemical bond of dopamine and PP, fluidity was greatly improved.

From this result, the present invention is expected to solve a problem in which injection molding is not possible due to low fluidity of an existing compound for heat dissipation.

Therefore, it is suggested that the complex according to the present invention, which exhibits such a high melt index, greatly contributes to yield and quality improvement of a product when the complex is injection-molded.

As described above, although the embodiments have been described with reference to specific embodiments and drawings, the present invention is not limited thereto. It is clear by those skilled in the art that various modifications and alterations may be made from the above description. Therefore, the spirit of the present invention should be defined by only the described claims below, and encompasses all equivalent modifications within the scope of the present invention.

Unless necessary in a context otherwise, it will be understood that the terms "comprise", "include", "comprising", and "including" used herein include proposed steps, elements, or a group of steps or elements, but do not preclude any other steps, elements, or groups of steps or elements.

INDUSTRIAL APPLICABILITY

As such, the present invention relates to a complex to which a polymer layer is bonded by modifying, with a catecholamine, the surface of a flaky graphite-fused complex having a structure in which nanoparticles are crystallized on the surface thereof at a high density. Particularly, the complex is capable of being evenly and homogeneously dispersed in a polymeric resin, and therefore can be usefully used to prepare a flaky-graphite-based polymer composite having excellent properties such as conductivity, thermal conductivity, and the like.

The invention claimed is:

1. A flaky-graphite-based complex, comprising:
   flaky graphite having crystallized nanoparticles chemically bonded to the surface thereof;
   a layer of a catecholamine, wherein the catecholamine is selected from the group consisting of norepinephrine, epinephrine, α-methyldopa, droxidopa, indoleamines, and serotonin; and
   a layer of a polymer.

2. The flaky-graphite-based complex according to claim 1, wherein the catecholamine is coated so as to have a thickness of 10 to 100 nm.

3. The flaky-graphite-based complex according to claim 1, wherein the crystallized nanoparticles are one or more particles selected from the group consisting of Ni, Si, Ti, Cr, Mn, Fe, Co, Cu, Sn, In, Pt, Au, Mg, and a combination thereof.

4. The flaky-graphite-based complex according to claim 1, wherein the polymer is selected from the group consisting of a thermosetting resin, a thermoplastic resin, and rubber.

5. The flaky-graphite-based complex according to claim 4, wherein the thermosetting resin is selected from the group consisting of an epoxy-based resin, a urethane-based resin, a melamine-based resin, a polyimide-based resin, and a mixture thereof.

6. The flaky-graphite-based complex according to claim 4, wherein the thermoplastic resin is selected from the group consisting of a polycarbonate-based resin, a polystyrene-based resin, a polysulfone-based resin, a polyvinyl chloride-based resin, a polyether-based resin, a polyacrylate-based resin, a polyester-based resin, a polyamide-based resin, a cellulose-based resin, a polyolefin-based resin, a polypropylene-based resin, a polyketone-based resin, a polyphenyl-based resin, a liquid crystal polymer-based resin, and a mixture thereof.

7. A method of preparing the flaky-graphite-based complex of claim 1, comprising the following processes of:
  (i) preparing a nanoparticle/flaky graphite-fused complex having crystallized nanoparticles chemically bonded to the surface thereof;
  (ii) coating the nanoparticle/flaky graphite-fused complex with a catecholamine, wherein the catecholamine is selected from the group consisting of norepinephrine, epinephrine, α-methyldopa, droxidopa, indoleamines, and serotonin; and
  (iii) bonding the catecholamine and a polymer by adding the nanoparticle/flaky graphite-fused complex coated with the catecholamine into a solution of a polymeric resin.

8. The method according to claim 7, wherein the crystallized nanoparticles are one or more particles selected from the group consisting of Ni, Si, Ti, Cr, Mn, Fe, Co, Cu, Sn, In, Pt, Au, Mg, and a combination thereof.

9. The method according to claim 7, wherein, in step (ii), the coating is performed using a liquid-based preparation dip-coating method or a dry plasma polymerization method.

10. The method according to claim 7, wherein, in the (iii) step, the polymeric resin is selected from the group consisting of a thermosetting resin, a thermoplastic resin, and rubber.

11. The method according to claim 10, wherein the thermosetting resin is selected from the group consisting of an epoxy-based resin, a urethane-based resin, a melamine-based resin, a polyimide-based resin, and a mixture thereof.

12. The method according to claim 10, wherein the thermoplastic resin is selected from the group consisting of a polycarbonate-based resin, a polystyrene-based resin, a polysulfone-based resin, a polyvinyl chloride-based resin, a polyether-based resin, a polyacrylate-based resin, a polyester-based resin, a polyamide-based resin, a cellulose-based resin, a polyolefin-based resin, a polypropylene-based resin, a polyketone-based resin, a polyphenyl-based resin, a liquid crystal polymer-based resin, and a mixture thereof.

13. The method according to claim 7, wherein the (iii) step is performed by a method selected from the group consisting of an in-situ polymerization method, a solution mixing method, and a melt mixing method.

14. A method of preparing a polymer composite, comprising:
  dispersing the flaky-graphite-based complex of claim 1 in a polymeric resin.

15. The method according to claim 14, wherein a polymer constituting the flaky-graphite-based complex is the same as the polymeric resin used in the dispersing.

16. The method according to claim 15, wherein the polymer is selected from the group consisting of a thermosetting resin, a thermoplastic resin, and rubber.

17. A flaky-graphite-based polymer composite prepared by the method of claim 14.

18. The flaky-graphite-based complex of claim 1 wherein the crystallized nanoparticles have an average diameter of 10 to 500 nm, are present at 5 to 50 wt % with respect to the entire flaky graphite, and cover 10 to 70% of a surface area of the entire flaky graphite.

19. The method of claim 7 wherein, in step (i), the crystallized nanoparticles have an average diameter of 10 to 500 nm, are present at 5 to 50 wt % with respect to the entire flaky graphite, and cover 10 to 70% of a surface area of the entire flaky graphite.

* * * * *